United States Patent
Wermann et al.

(10) Patent No.: US 11,060,643 B2
(45) Date of Patent: Jul. 13, 2021

(54) SWIVEL CONNECTOR

(71) Applicant: Saturn Machine Works Ltd., Edmonton (CA)

(72) Inventors: Bernard Wermann, Edmonton (CA); Patrick Folick, Edmonton (CA); Michael Lang, New Sarepta (CA)

(73) Assignee: Saturn Machine Works Ltd., Edmonton (CA)

( * ) Notice: Subject to any disclaimer, the term of this patent is extended or adjusted under 35 U.S.C. 154(b) by 158 days.

(21) Appl. No.: 15/808,811

(22) Filed: Nov. 9, 2017

(65) Prior Publication Data
US 2019/0113162 A1    Apr. 18, 2019

(30) Foreign Application Priority Data
Oct. 13, 2017   (CA) .................................. CA 2982276

(51) Int. Cl.
*F16L 27/08*    (2006.01)
*F16L 15/00*    (2006.01)

(52) U.S. Cl.
CPC ......... *F16L 27/0828* (2013.01); *F16L 15/006* (2013.01)

(58) Field of Classification Search
CPC .. F16L 27/0824; F16L 27/082; F16L 27/0828
USPC ...................................................... 285/261
See application file for complete search history.

(56) References Cited

U.S. PATENT DOCUMENTS

| | | | | |
|---|---|---|---|---|
| 693,367 A | * | 2/1902 | Brooke ................... | F16L 27/04 285/261 |
| 793,778 A | * | 7/1905 | Fischer ................... | F16L 27/04 285/261 |
| 2,519,147 A | * | 8/1950 | Miller ................... | F16L 27/067 285/261 |
| 2,723,136 A | * | 11/1955 | Deubler .............. | F16L 27/0828 285/110 |
| 3,273,592 A | * | 9/1966 | Deubler et al. ........... | F16K 3/08 137/624.13 |
| 3,347,570 A | * | 10/1967 | Roessler ............. | F16L 27/0824 277/362 |
| 3,405,959 A | * | 10/1968 | Walker ................. | F16J 15/3456 277/380 |
| 3,460,857 A | * | 8/1969 | Larkin ................ | F16L 27/0828 277/391 |
| 3,889,983 A | * | 6/1975 | Freize ................. | F16L 27/0828 277/348 |

(Continued)

FOREIGN PATENT DOCUMENTS

EP    0633828    4/1997

OTHER PUBLICATIONS

Downloaded from www.landefeld.de: Threaded Nozzles Rotatable, Ball Bearing Mounted, PN 24; Jul. 2017; 2 pages.
(Continued)

*Primary Examiner* — David Bochna
(74) *Attorney, Agent, or Firm* — Lowe Graham Jones PLLC

(57) ABSTRACT

A swivel connector has a bore for conveying fluid and has end portions that rotate with respect to each other. An interface between the end portions intersects the bore at a narrow portion of the bore to create a venturi to keep debris out from the interface between the end portions.

11 Claims, 3 Drawing Sheets

(56) References Cited

U.S. PATENT DOCUMENTS

| | | | | |
|---|---|---|---|---|
| 3,957,291 A | * | 5/1976 | Edling | F16L 39/04 285/261 |
| 3,967,841 A | * | 7/1976 | Kendrick | F16L 27/0828 285/276 |
| 4,296,952 A | * | 10/1981 | McCracken | F16L 27/0828 285/276 |
| 4,620,728 A | * | 11/1986 | Barth | F16L 27/0824 285/14 |
| 4,817,995 A | * | 4/1989 | Deubler | F16L 27/0828 285/14 |
| 4,901,928 A | | 2/1990 | Abbott et al. | |
| 5,165,734 A | * | 11/1992 | Smith | F16L 27/0828 285/276 |
| 5,169,181 A | * | 12/1992 | Timm | F16L 27/0828 277/358 |
| 5,285,744 A | | 2/1994 | Grantham et al. | |
| 5,402,939 A | | 4/1995 | Shank, Jr. | |
| 5,496,075 A | * | 3/1996 | Ostermann | F16L 27/0828 285/190 |
| 5,795,214 A | | 8/1998 | Leon | |
| 5,816,624 A | * | 10/1998 | Smith | F16L 27/082 285/276 |
| 5,931,507 A | * | 8/1999 | Medsker | F16L 27/0828 285/278 |
| 6,062,957 A | | 5/2000 | Klaft et al. | |
| 6,419,279 B1 | * | 7/2002 | Latham | F16L 23/036 285/261 |
| 6,698,669 B2 | * | 3/2004 | Rieben | F16L 27/0824 239/225.1 |
| 6,736,408 B2 | | 5/2004 | Olgado et al. | |
| 7,165,635 B2 | * | 1/2007 | Kauffman | E21B 17/05 285/261 |
| 7,229,102 B2 | * | 6/2007 | Kubala | F16L 27/082 277/530 |
| 7,399,001 B2 | * | 7/2008 | Maier | F16L 27/0828 285/121.1 |
| 8,146,954 B2 | * | 4/2012 | Su | F16C 11/0642 285/261 |
| 10,502,349 B2 | * | 12/2019 | Petrou | F16L 27/082 |

OTHER PUBLICATIONS

Downloaded from www.air-way.com; Hydraulic Fittings; Jul. 2017; 1 page.

"Spherical Washer Sets (Self-Aligning Washers)," Morton Machine Works, Millersburg, PA, USA, Sep. 13, 2017, retrieved from the Internet on Nov. 11, 2020, at https://mortonmachine.com/spherical-washer-sets-self-aligning-washers, 3 pages.

"Washer (hardware)," Wikipedia, retrieved from the Internet on Nov. 11, 2020, at https://en.wikipedia.org/wiki/Washer_(hardware), 11 pages.

* cited by examiner

SWIVEL CONNECTOR

PRIORITY CLAIM

This application claims the benefit of priority from Canada Patent Application No. 2,982,276, filed Oct. 13, 2017, the contents of which is incorporated by reference.

FIELD OF THE INVENTION

Blast nozzle connectors

BACKGROUND OF THE INVENTION

Swivel connectors for hoses, allowing rotational movement of the hoses about an axis, are known. However, the rotating parts form an interface that may collect debris. This can be particularly be a problem for blast hoses, which convey particles within a fluid.

SUMMARY OF THE INVENTION

A swivel connector has a bore for conveying fluid and has end portions that rotate with respect to each other. An interface between the end portions intersects the bore at a narrow portion of the bore to create a venturi to keep debris out from the interface between the end portions.

Thus, there is provided a swivel connector having a first housing element, a second housing element rotatably connected to the first housing element to define an axis of rotation, the first housing element and the second housing element defining a bore substantially aligned with the axis of rotation, and extending from a first connector of the first housing element adapted to attach to a first hose, through the first housing element and the second housing element to a second connector of the second housing element adapted to attach to a second hose, the first housing element contacting the second housing element to form an interface that intersects the bore at a portion of the bore with smaller cross section than the first hose and the second hose.

In various embodiments, there may be included any one or more of the following features: the second housing element may include a seal washer contacting the first housing element to form the interface. The first housing element may include a static liner contacting the seal washer to form the interface. The second housing element may be rotatably connected to the first housing element by bearings arranged between the first housing element and the second housing element.

These and other aspects of the device and method are set out in the claims.

BRIEF DESCRIPTION OF THE DRAWINGS

Embodiments will now be described with reference to the figures, in which like reference characters denote like elements, by way of example, and in which.

DETAILED DESCRIPTION OF THE PREFERRED EMBODIMENT

Figure 1:
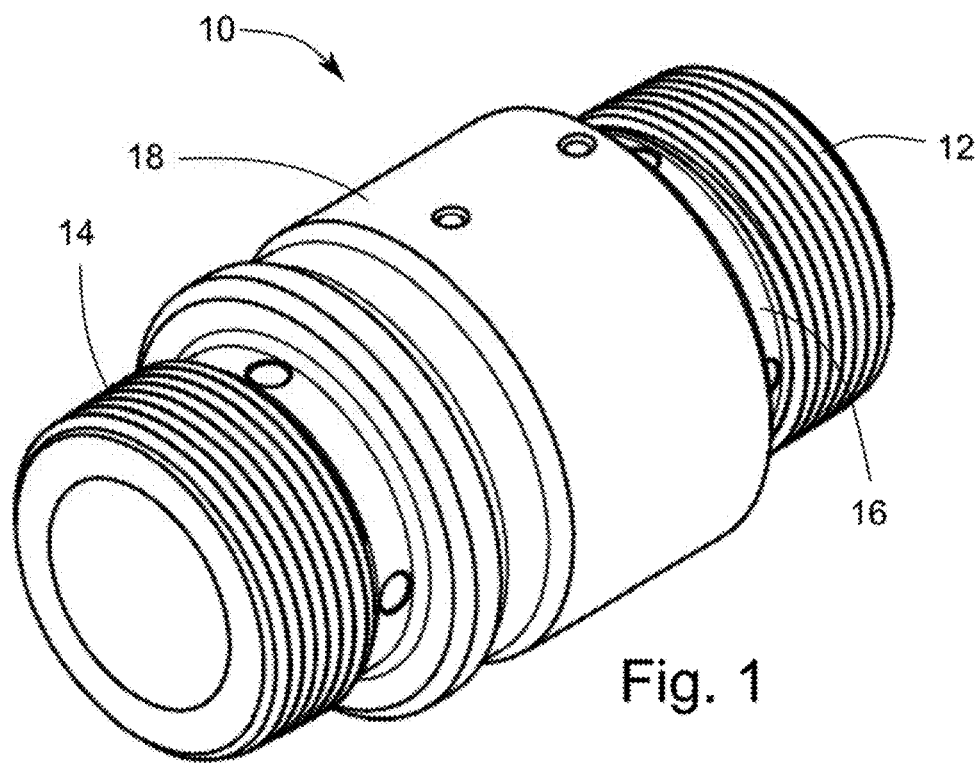
FIG. 1 is an isometric view of an embodiment of a swivel connector.

FIG. 1 shows an isometric view of a swivel connector 10. At the ends are connectors 12 and 14, each for connecting to a hose or to any other equipment adapted to be connected to a hose connector, for example a nozzle. In the embodiment shown, both connectors 12 and 14 are threaded male connectors. Any suitable connectors 12 and 14 may be used, including male or female threaded connectors or non-threaded connectors. The swivel connector 10 comprises a first housing element 16 and a second housing element 18 rotatably connected to the first housing element 16. In the embodiment shown, the first housing element 16 extends within the second housing element 18.

Figure 2:
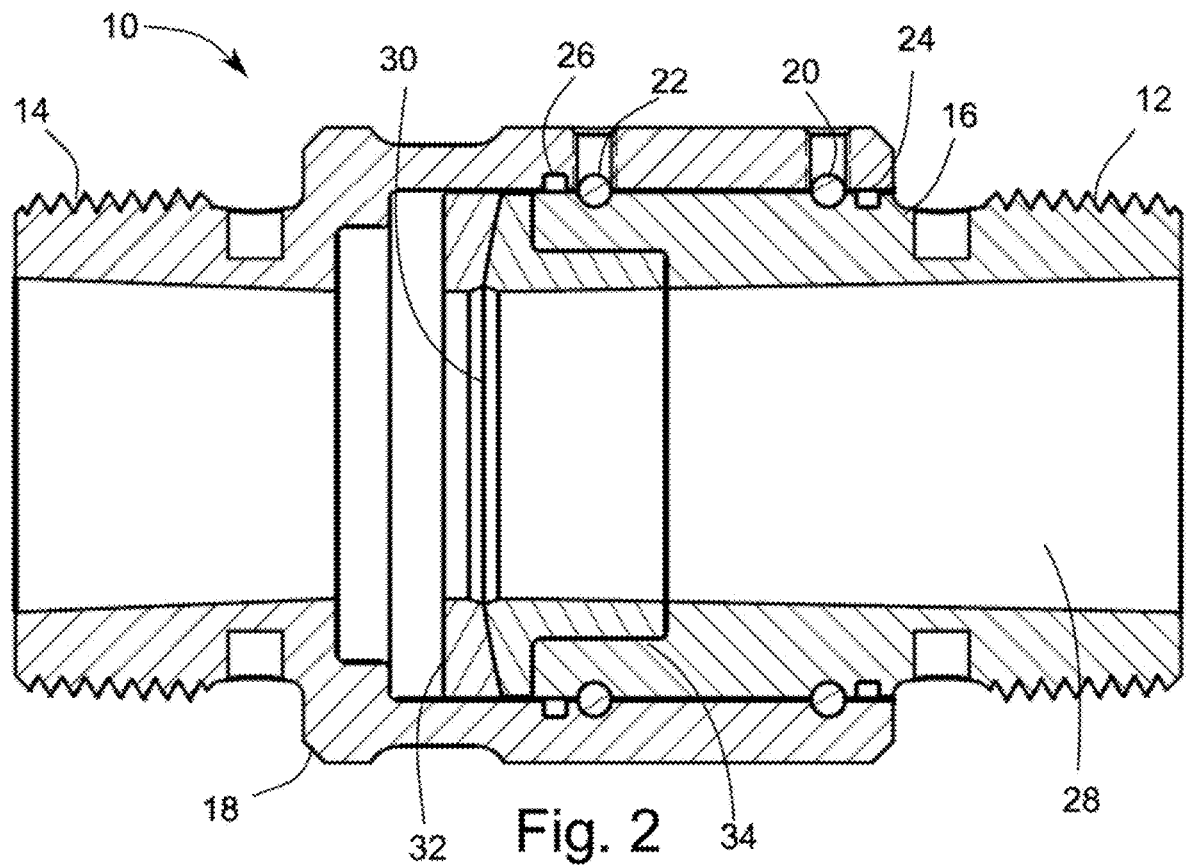
FIG. 2 is a side cutaway view of the embodiment of FIG. 1.

The inner workings of the swivel connector 10 are better shown in FIG. 2, which shows a side cutaway view of the swivel connector. In this embodiment, bearings 20 and 22 support the second housing element 18 for rotation relative to the first housing element 16. Seals 24 and 26 isolate the bearings. By using two sets of bearings 20 and 22 the seal can be kept better aligned than with a single set of bearings. This helps prevent dirt from working past the seals. The seals also only need to maintain sealing with respect to motion in one direction, i.e. rotary motion about a central axis of rotation. This also can help make the rotation of the swivel connector smooth, and an overall thickness of the swivel connector may be kept low. The first housing element 16 and second housing element 18 define a bore 28 substantially aligned with the axis of rotation of the second housing element 18 with respect to the first housing element 16, the bore 28 extending from the first connector 12, through the first housing element 16 and the second housing element 18 to the second connector 14.

The first housing element 16 and the second housing element 18 contact each other at an interface 30. This interface must contact the bore at some point, and debris can potentially collect at the interface 30 to degrade the performance of the device. In order to reduce the propensity to collect debris, the interface 30 is made to intersect with the bore 28 at a relatively narrow portion of the bore to form a venturi. As can be seen in FIG. 2, in this embodiment the bore 28 forms a narrowest point substantially where the interface 30 intersects with the bore 28. There is however a slight widening at the exact point where the interface 30 intersects with the bore 28. The hoses (not shown) which would be adapted to connect with either of the connectors 12 and 14 in FIG. 2 would have a diameter substantially similar to the threads of the connectors 12 and 14, and thus would have a larger cross section than the bore 26 at the intersection of the interface 30 and the bore 28.

The portions of the first housing element 16 and the second housing element 18 forming the interface 30 adjacent to the bore 28 may be exposed to wear, and may be made removable to allow for easy replacement. In this embodiment, a removable seal washer 32 forms the portion of the second housing element 18 contacting the second housing element 18 to form the interface 30 adjacent to the bore, and a removable static liner 34 forms the portion of the first housing element 16 contacting the first housing element 16 (in this case contacting the seal washer 32) to form the interface 30 adjacent to the bore 28.

Figure 3:
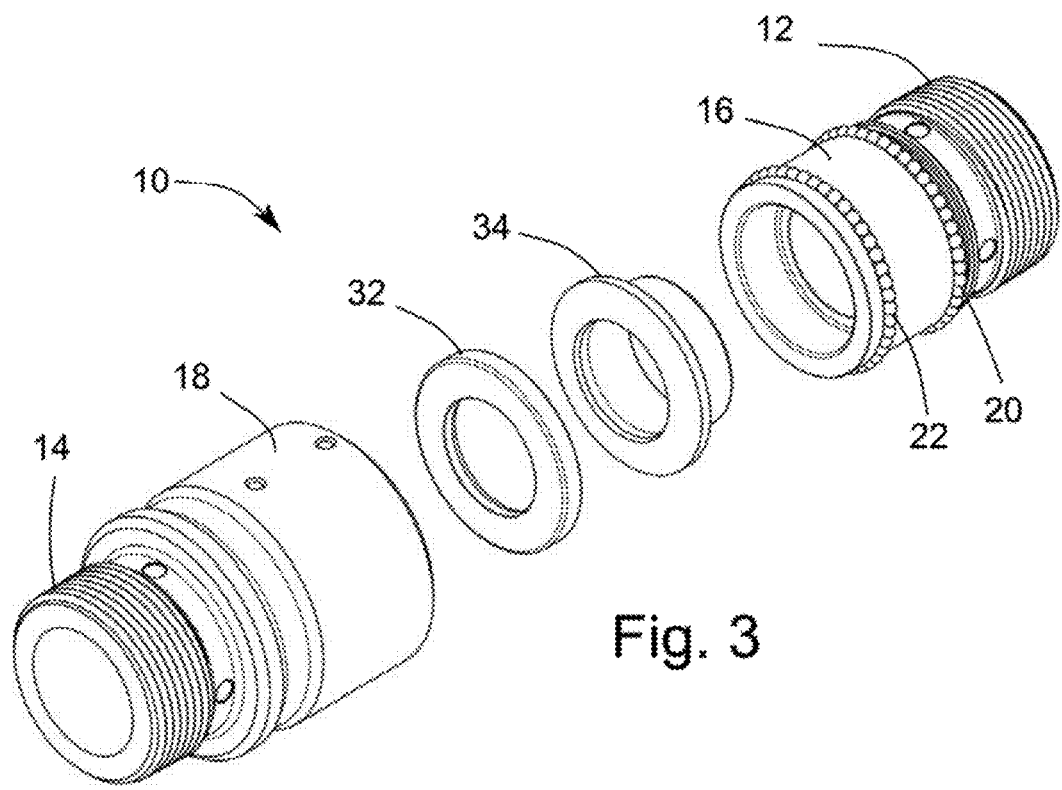
FIG. 3 is an exploded isometric view of the embodiment of FIG. 1.

FIG. 3 shows an exploded view of the swivel connector of FIG. 1. The seal washer 32 and the static liner 34 may be removed from the swivel connector 10 by separating the housing elements as illustrated in FIG. 3, and the swivel connector reassembled by the reverse procedure. The seal washer 32 may have an unstressed outer diameter slightly larger than an inner diameter of the remainder of the housing element of which it forms a part, in order that it be gripped by the remainder of the housing element 18.

Figure 4:
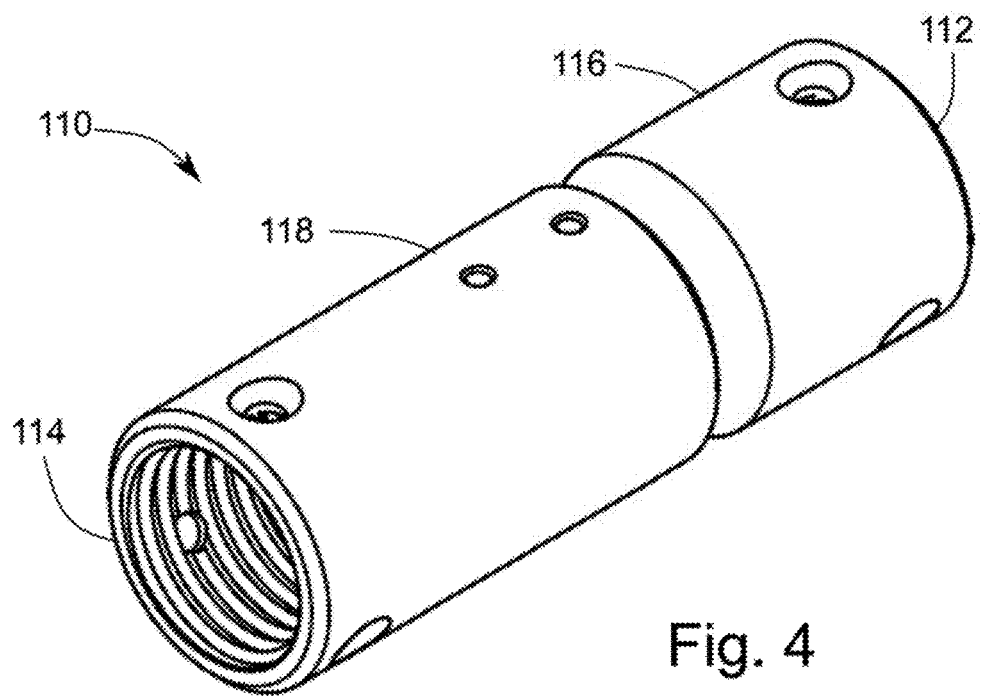
FIG. 4 is an isometric view of another embodiment of a swivel connector.
Figure 5:
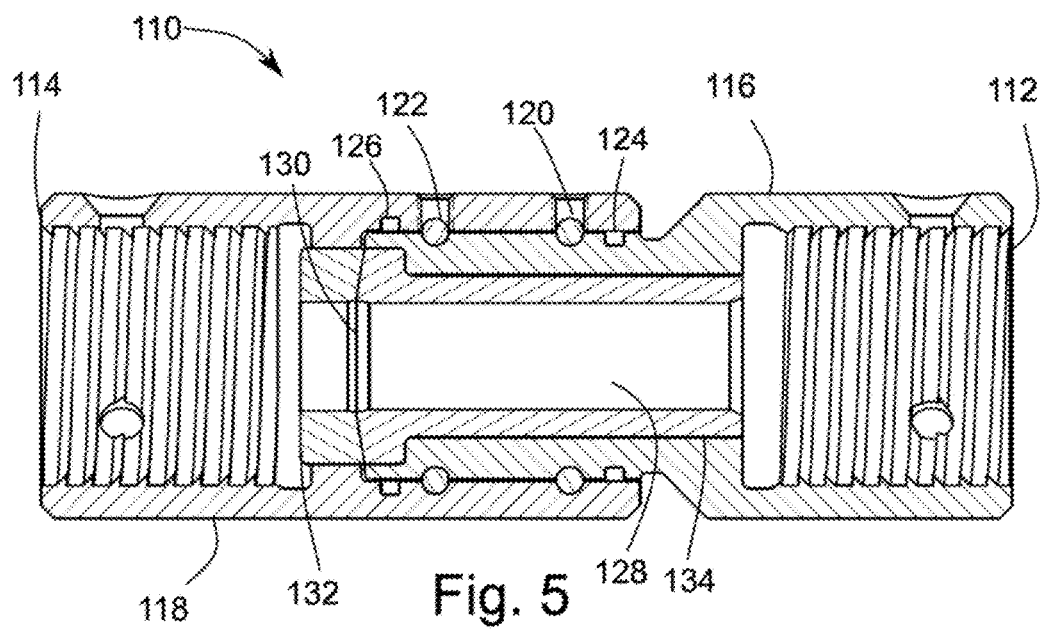
FIG. 5 is a side cutaway view of the embodiment of FIG. 4.
Figure 6:
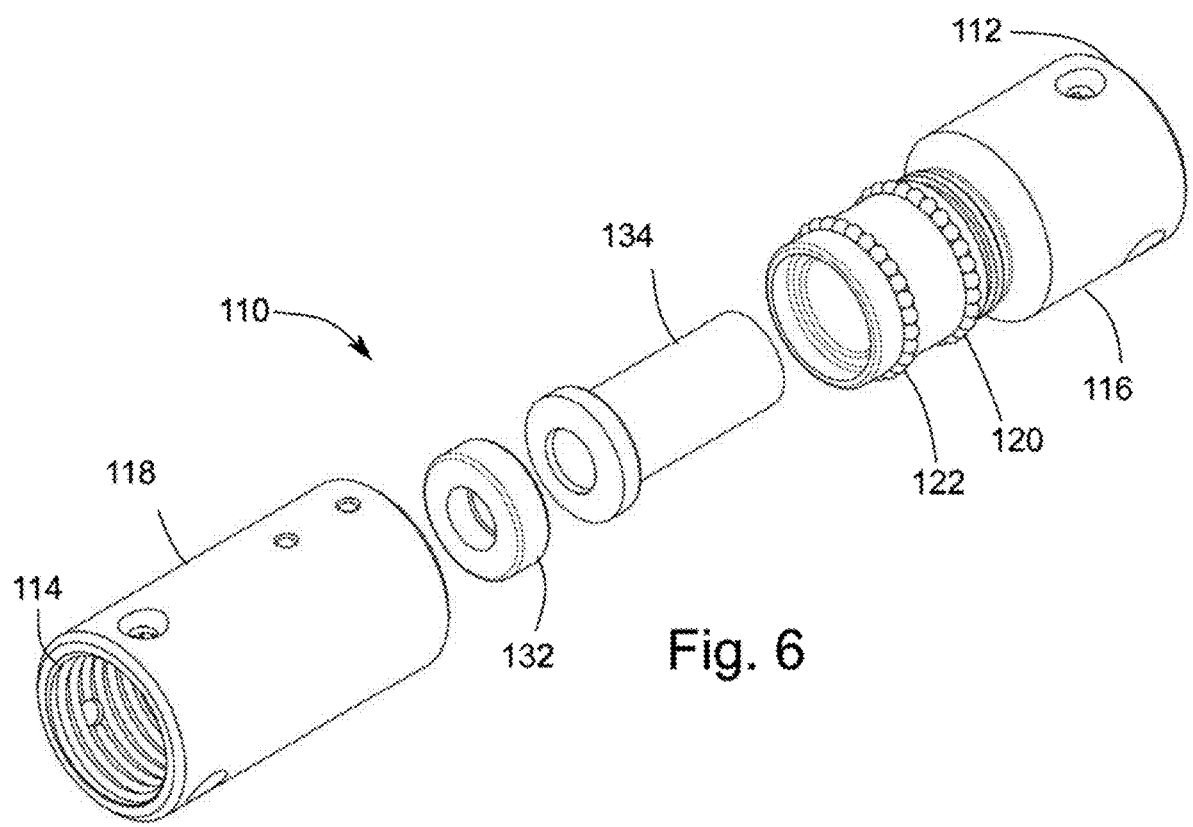
FIG. 6 is an exploded isometric view of the embodiment of FIG. 4.

FIGS. 4-6 show another embodiment of a swivel connector, here labeled 110. FIG. 4 shows an isometric view, FIG. 5 a side cutaway view, and FIG. 6 an exploded view. For the sake of brevity, the description of this second embodiment will be limited to differences from the embodiment shown in FIGS. 1-3. First connector 112 and second connector 114 in this embodiment are threaded female connectors. First housing element 116 and second housing element 118 are accordingly shaped differently than the first housing element 16 and second housing element 18 of FIGS. 1-3. In this embodiment, seal washer 132 is supported by a portion of the remainder of the second housing element 118 that extends inward. The static liner 134 of this embodiment is longer than the static liner 34 of the embodiment of FIGS. 1-3. Instead of narrowing to a substantially narrowest point, the bore remains substantially the same in cross section throughout the static liner 134, except for, as in the first embodiment, a slight widening at the exact point where the interface 130 intersects with the bore 128. The narrow portion of the bore is, as in the embodiment of FIGS. 1-3, smaller in cross section than hoses (not shown) adapted to connect to the connectors 112 and 114. Bearings 120 and 122 and seals 124 and 126 are similar to their counterparts in the embodiment of FIGS. 1-3.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A swivel connector for connecting a first blast hose to a second blast hose, the swivel connector comprising:
    a first housing element;
    a second housing element rotatably connected to the first housing element to define an axis of rotation fixed with respect to the first and second housing elements;
    the first housing element and the second housing element defining a bore substantially aligned with the axis of rotation, and extending from a first end of the bore defined by a fluid adjacent interface, in use of the swivel connector, between the bore and the first blast hose, to which a first connector of the first housing element is adapted to attach, through the first housing element and the second housing element to a second end of the bore defined by a fluid adjacent interface, in use of the swivel connector, between the bore and the second blast hose, to which a second connector of the second housing element is adapted to attach; and
    the first housing element contacting second housing element to form an interface that intersects the bore at a groove within the bore, a first portion of the bore being outside and adjacent to the groove and having a smaller cross section than a second portion of the bore outside the groove, where:
        the first and second portions of the bore form respective ends of a tapered portion of the bore widening away from the groove, or
        the second portion of the bore is adjacent to the groove and on the opposite side of the interface from the first portion of the bore.

2. The swivel connector of claim 1 in which the second housing element is rotatably connected to the first housing element by bearings arranged between the first housing element and the second housing element.

3. The swivel connector of claim 2 in which the bearings are arranged between a portion of the first housing element formed of a first unitary piece of material and defining the first connector and a portion of the second housing element formed of a second unitary piece of material and defining the second connector.

4. The swivel connector of claim 1 in which the second housing element comprises a seal washer contacting the first housing element to form the interface, the bore being defined at least in part by, and extending through, the seal washer.

5. The swivel connector of claim 4 in which the first housing element comprises a static liner contacting the seal washer to form the interface, the bore being defined at least in part by, and extending through, the static liner.

6. The swivel connector of claim 5 in which the static liner defines a taper narrowing the bore towards the groove.

7. The swivel connector of claim 5 in which the bore is generally narrower within the static liner than within the seal washer.

8. The swivel connector of claim 1 in which the interface at which the first housing element contacts the second housing element is a spherical interface.

9. A swivel connector for connecting a first blast hose to a second blast hose, the swivel connector comprising:
    a first housing element;
    a second housing element rotatably connected to the first housing element to define an axis of rotation;
    the first housing element and the second housing element defining a bore substantially aligned with the axis of rotation, and extending from a first end of the bore defined by a fluid adjacent interface, in use of the swivel connector, between the bore and the first blast hose, to which a first connector of the first housing element is adapted to attach, through the first housing element and the second housing element to a second end of the bore defined by a fluid adjacent interface, in use of the swivel connector, between the bore and the second blast hose, to which a second connector of the second housing element is adapted to attach; and
    the first housing element comprising a static liner and the second housing element comprising a seal washer, the static liner contacting the seal washer to form an interface that intersects the bore at a groove within the bore, the bore being defined at least in part by, and extending through, each of the seal washer and static liner, a first portion of the bore being outside and adjacent to the groove and having a smaller cross section than a second portion of the bore outside the groove, where:
        the first and second portions of the bore form respective ends of a tapered portion of the bore widening away from the groove, or the second portion of the bore is adjacent to the groove and on the opposite side of the interface from the first portion of the bore.

10. The swivel connector of claim 9 in which the static liner defines a taper narrowing the bore towards the groove.

11. The swivel connector of claim 9 in which the bore is generally narrower within the static liner than within the seal washer.

\* \* \* \* \*